United States Patent
Endzweig

[11] 3,867,048
[45] Feb. 18, 1975

[54] PLUG CONNECTIONS FOR VERTICALLY ABUTTING FRAME SECTIONS

[76] Inventor: Abraham Endzweig, Brandlburgerstrasse 104, Regensburg, Germany

[22] Filed: Feb. 20, 1973

[21] Appl. No.: 333,466

[52] U.S. Cl................ 403/252, 403/255, 403/264, 52/756, 52/758 H, 211/182
[51] Int. Cl............................. F16b 7/18, F16b 7/20
[58] Field of Search .......... 403/234, 237, 252, 254, 403/255, 258, 264, 353; 5/292, 293, 299; 211/182, 177; 52/756, 758 H, 758 F; 151/68

[56] References Cited
UNITED STATES PATENTS

| | | | |
|---|---|---|---|
| 2,053,561 | 9/1936 | Jennison | 403/258 |
| 2,465,548 | 3/1949 | Michael | 151/68 |
| 3,332,374 | 7/1967 | Ferdinand et al. | 108/107 |

FOREIGN PATENTS OR APPLICATIONS

| | | | |
|---|---|---|---|
| 683,386 | 11/1952 | Great Britain | 403/264 |
| 6,602,663 | 9/1966 | Netherlands | 403/258 |

*Primary Examiner*—Jordan Franklin
*Assistant Examiner*—C. L. Berman
*Attorney, Agent, or Firm*—John C. Holman

[57] ABSTRACT

A plug connector for joining together frame sections comprising a bar which has a recess in at least one end of it. There is a cross wall member inside the recess, spaced from pieces, end of the bar, and having a threaded hole in it for receiving a screw bolt. The screw bolt has an enlarged head which protrudes from the end of the bar, a threaded end portion for threading into the cross wall member, and a portion intermediate the head and threaded portion which is square in cross-section and has a width at least equal to the diameter of the threaded portion. A biasing means is mounted about the screw bolt and positioned between the cross wall and an auxilliary pusher means. The enlarged head of the screw bolt is fitted into a hole and slot-arrangement in the member being joined, and then the bar is rotated in a given direction so as to screw the screw bolt inwardly thereby making a solid joint. A guide plate having a square aperture of a dimension which prevents rotation is mounted on the intermediate portion of the screw bolt, this guide member having an extension which preferably has indicia marked on it for indicating the direction of rotation to tighten the connection. It is furthermore possible to provide various contoured members so that the plug connector can connect rectilinear as well as curvilinear ppieces, i.e., pipes, etc.

9 Claims, 16 Drawing Figures

3,867,048

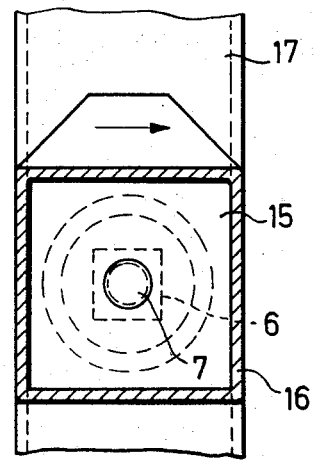
Fig.4
Fig.5
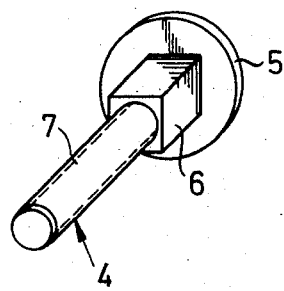
Fig.6a  Fig.6b
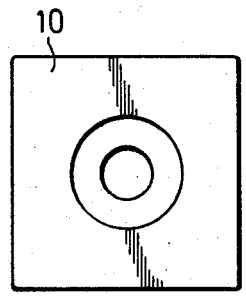 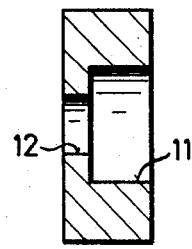
Fig.7
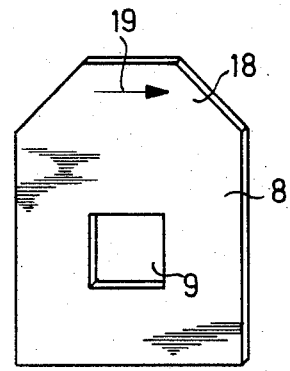 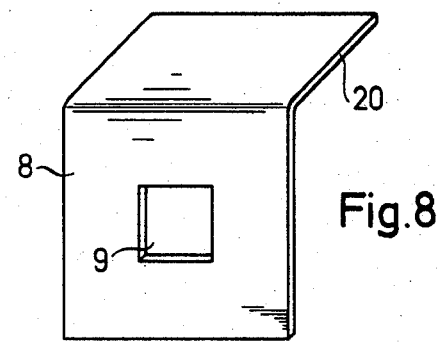
Fig.8

PLUG CONNECTIONS FOR VERTICALLY ABUTTING FRAME SECTIONS

BACKGROUND OF THE INVENTION

The instant invention concerns a plug connection means for vertically abutting frame sections comprising hollow profiles of free-standing shelves, furniture pieces, etc., whereby frame sections are provided with rectangular insert-slots.

In the prior art free standing shelves of this type, the shelves have plug connections wherein the connecting means are a pin with a head provided on one frame section of the free-standing shelf which is inserted into a hole with a vertical slot on the other. Once the pin with the enlarged head is inserted into the slot there is no way to tighten the connection so that the connection has too much play or sway and the shelf tends to end up in a slanted position rather than vertical.

BRIEF SUMMARY OF THE INVENTION

It is the purpose of the instant invention to provide a connection for a free-standing frame, which is an assemblage of individual frame sections, by means of plug connections between the individual vertically errected frame sections, whereby the connection is absolutely solid as if it had been welded. The connection should also be easy and simple to errect and disassemble so that untrained persons may do it. This is accomplished by the instant invention in that a frame member has an open end which is provided with a thread-hole for a screw bolt and the screw bolt extends beyond the open end of the frame section. The screw bolt is screwed into the thread hole and has an enlarged head at its opposite end which extends beyond the open end. Between the enlarged head and threaded portion is a square in cross-section interim piece, the width of which is at least as large as the diameter of the threaded portion. A guide plate is non-rotatably mounted on the interim piece and an auxiliary pusher means is positioned on the threaded portion with biasing means between the pusher and a fixed cross wall into which the screw bolt is threaded. The frame member, usually the horizontal bar, has screw bolts in both ends, one having a right-handed thread and the other end having a left-handed thread. Therefore, when the horizontal bar is rotated the connections at either end are either loosened or tightened, and with proper pressure the connection can be made so tight as to approximate a rigid weld connection. The tightness can be individually adjusted with the guide plate, the turning of which will turn the respective screw bolt so as to selectively tighten one connection without affecting the other.

BRIEF DESCRIPTION OF THE DRAWINGSS

The instant invention is illustrated in the accompanying drawing, in which:

FIG. 4 is a right-angle view of FIG. 3;

FIG. 5 shows a screw bolt in front view and end view from the thread end;

FIGS. 6a and 6b shows a front and cross-sectional view of an auxilliary pusher means;

FIG. 7 shows a front view of a guide plate for interconnections;

FIG. 8 shows a side view of another guide plate with an angled extension for closing off the top of a hollow profile;

DETAILED DESCRIPTION OF THE PREFERRED EMBODIMENT

Figure 1:
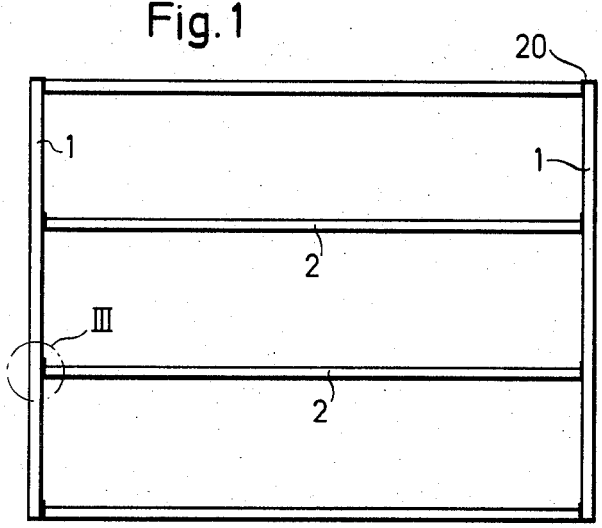
FIG. 1 illustrates the front view of a free-standing shelf.
Figure 2:
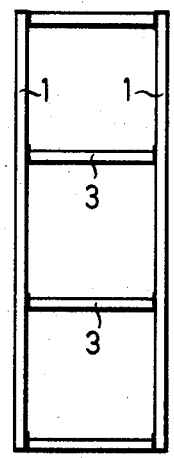
FIG. 2 is a side view of the free-standing shelf.

Looking at FIGS. 1 and 2, frame sections 1, horizontal bars 2 and crossbars 3 from a free-standing shelf having a geometric hollow profile. The frame sections are provided with inlet holes and vertical slots, and the horizontal bars 2 and crossbars 3 are provided with plug-connections.

The plug-connection comprises a screw bolt 4 with an enlarged head 5, an interim means 6 which is square in cross-section, and an end-piece 7 which is entirely or only at its end portion provided with a screw thread. The diameter of the end-piece 7 must be no larger than the width of one of the sides of the interim means 6.

A guide plate 8 (FIG. 7) is positioned on the square in cross-section interim means 6, the guide plate being provided with a square aperture 9 which is commensurate in size with the square interim means 6, so that the guide plate 8 is axially movable on the interim means, but not rotatable.

Figure 3:
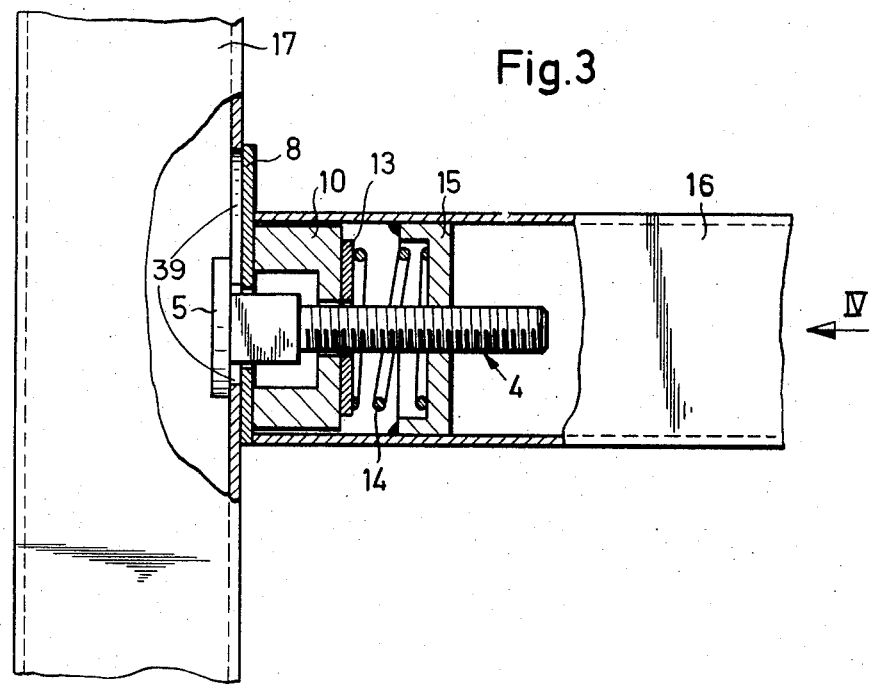
FIG. 3 is a cross-sectional view of the plug connection means, the two communicating and vertically abutting frame sections are shown by hidden line.

Adjacent the guide plate is an auxilliary pusher means 10 (FIG. 6) which is provided with a two-diameter center-opening. However, it may be provided with only a single diameter center-opening. Portion 11 of this center opening, which faces the enlarged head 5 of screw bolt 4, or the single diameter opening not shown, have a diameter which will permit the interim means 6 to rotate therein. The second portion 12 of the center opening has a diameter which will permit the adjacent end piece 7 of the screw bolt 4 to axially slide therein. Adjacent the auxilliary pusher means 10 is a washer 13, preferably of metal, and adjacent thereto is a spring means 14 which supports itself against a cross wall 15 which is fixedly arranged near the open end of an adjacent frame section 16 (FIG. 3) for example, by means of welding. This cross wall 15 is provided in its center with a threaded hole to engage the end piece 7 of screw bolt 4, so that by turning the screw bolt the enlarged head 5 is moved in a direction toward or away from the wall of another frame section 17.

In the connections between the lower three bars 2 and 3 of the frames for the free-standing shelf as shown in FIGS. 1 and 2, the guide plate 8 is provied with an extension 18 towards one side, an arrow 19 indicates the direction of rotation or the bar for the purpose of fastening same on the frame. By turning the bar 2 or the frame section 15 at both ends and consequently the crosswall 15 which is fixedly arranged therein and provided with a thread, the screw bolt 4 moves towards the right (FIG. 3) and the head is tightly pulled towards the frame section 17. Should bars 2, 3, and therefore frame section 16, be turned in counter-direction to the arrow 19, the screw bolt 4 is turned to the left (FIG. 3) and the head is loosened from the wall of the frame section 17, so that the frame section 16 may be pulled out of the longitudinal slot and the insert-hole (not shown).

The guide plates 8 are advantageously provided with extensions so that during the tightening of the bars or frame sections the lacquer or paint is not scratched off. The extensions are preferably maintained in line with the longitudinal axis of frame section 16 or 17, so as not to protrude out from the profile.

In order to simultaneously tighten or loosen both connections by turning a frame section or a bar in one direction, viz. the screw bolts 4 move at both ends of the frame section in opposite directions, the screw bolt is provided on one end with a right-handed thread, and on the other end with a left-handed identical thread. This causes the screw bolts 4 to move during the turning of the bar or the frame section at both ends of the frame section either towards each other for the purpose of establishing the connection, or to move away from each other for the purpose of disconnecting the two frame sections.

The guide plate 8 fulfills a dual purpose. Firstly, the wall being held by enlarged head 5 is reinforced at the insert-point; and secondly, the guide plate 8 provides the possibility of adjusting the abutting pressure at both ends at an evenly high level by means of individually turning the looser guide plate in in the direction of arrow 19 so that each of the bars 2, 3 has an equally tight connection with the respective support frame 1. This equalization of the abutting pressure at both ends of the frame section is accomplished in the following manner:

One end of a bar 2 or a frame section 16, for example, is placed so that the right-handed screw bolt 4 is inserted into the hole and longitudinal slot 39 in the support frame 1 or connecting frame section 17. The longitudinal slot of the prior art had such a width that the square cross-sectional interim means 6 of the screw bolt 4 was guided into the longitudinal slot but could not be rotated therein. The guide plate 8 on the frame 1 or the frame section 17 riding on the square cross-section interim means 6 is thereby set in such a way that it is positioned in the longitudinal direction of the frame or of the frame sections, and is covered thereby. Then the bars 2 or 3 are rotated so as to tighten those bars to the frame sections 1. In this position, the guide plate 8 which is non-rotatably positioned on the square cross-sectional interim means 6, lies between frame sections 16 and 17 (FIG. 3) and the extension 18 is aligned with frame section 17. In order to be able to adjust the connection at the other end of the bar or frame section with the left-handed thread, one loosens the connection with the right-handed thread by rotating the bar or the frame section 16 by one half or a total revolution in counter-direction of the arrow 19. If the bar or frame section 16 has a square cross-section construction, it is then easy to rotate it.

After the frame section 16 and bar 2 have thus been loosened again, the guide plate with the extension is then adjusted on the end so that the extension is in the longitudinal direction of the adjacent frame section. Frame section 16 is then tightened by turning in the direction of the arrow 19. In this way the extension 18 of guide plate 8 at both ends of the horizontal bars 2 or frame section 16 can be adjusted so as to align the extension with the adjacent frame section 1 or 17. Once this is accomplished, the extensions will be aligned and the horizontal bar 2 or frame section 16 can be turned in the direction of arrow 19 to securely tighten the framework.

The framework sections can have gripper means on them or can be square in cross-section to enable the bars 2 or frame section 16 to be turned extremely tight so that the connection looks like a weld-seam. In this way, the free-standing shelf becomes rigid, and does not slant when loads are placed on it.

The spring means 14 covers only a few threads, and biases the auxilliary pusher 10 by means of washer 13, which may consist of metal or of a synthetic material, towards the guide plate 8. The guide plate is thereby pushed towards the enlarged head 5 of the screw bolt 4. This biasing functions to prevent the screw bolt 4 from turning.

To permit entry of the uppermost horizontal bar 2 and cross bar 3, the hollow profile stands 1 are provided with an upward opening which looks unaesthetical and may have dangerously sharp corners etc. In order to close these up, the guide plate 8 is provided with a right-angle curve 20 (FIG. 8) in place of the extension 18 with arrow 19, whereby the curved portion is of such a size and shape that it completely covers the hollow space of the hollow profile stands.

This connection may be utilized not only for free-standing shelves but also for pieces of furniture such as tables, benches, chairs, etc. This permits the frames of the furniture to be disassembled so that it may be packed in a smaller space for the purpose of transporting same. It can be assembled very rapidly and does not require people trained to assemble or disassemble the furniture, thereby allowing most anyone to easily set the furniture up.

In place of an extension 18 of the guide plate 8, there may also be used any type of indicia which indicates the setting of the guide plate relative to the screw bolt 4.

The plug-in connection according to the instant invention has still the further advantage in that it consists of few individual parts and achieves an absolutely solid connection.

The free-standing shelf can consist of wood in place of hollow metal profiles. In such a case, the ends of the bars or connecting frame sections 16 are provided with respective recesses for accepting the plug-in connecting means and a screw-socket which is threaded to accept the screw bolt 4.

Figure 9:
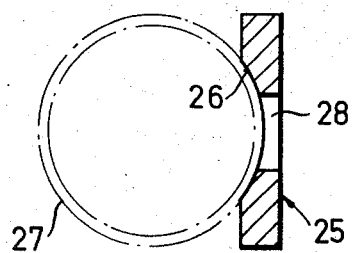
FIG. 9 is an interim pipe disk in cross-section.
Figure 10:
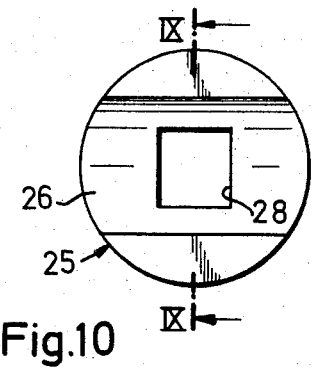
FIG. 10 is an interim pipe disk according to FIG. 9 as viewed from the top.

If it is desired to utilize the device of the instant invention for the purpose of connecting pipes which are round in cross-section, this requires only that the auxilliary pusher means 10 is of a round or concave construction so that it fits the profile of the pipe in a manner to be laterally displaceable (not shown). However, in place of the guide plate 8 there is utilized an interim pipe disk 25 (FIGS. 9 and 10) which consists of a disk having a partially cylindrical recess 26, the diameter of which is in accordance with the outer diameter of the pipe 27 which is to be connected. This interim pipe disk 25 is also provided with a square opening 28 which corresponds with the guide plate 8 and which is thereby fixedly arranged on the interim means 6 of the screw bolt 4, however, it is laterally displaceable. The interim pipe disk 25 can serve for initially turning the screw bolt 4 until the concave recess 26 abuts the pipe 27. This interim pipe disk has the task of providing for a tight final-form connection between the two parts.

Figure 11:
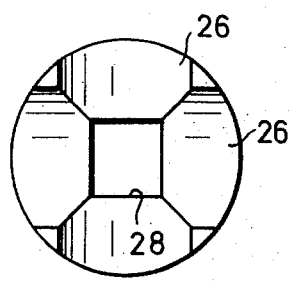
FIG. 11 is a different embodiment of the interim pipe disk.

The interim pipe disk may also be provided with concave cylindrical recesses 26 which are at angles to one another (see FIG. 11).

Figure 12:
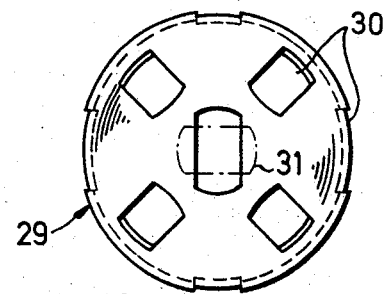
FIG. 12 shows a ball-shaped member for special room constructions with ceiling beams.
Figure 13:
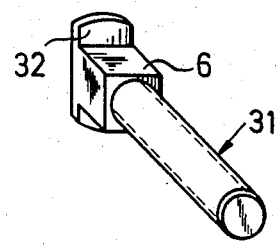
FIG. 13 shows a screw bolt for beam construction of a room seen from the end of the thread.

For errecting a special frame room-structure with frames or beams of any chosen cross-section, a hollow ball-shaped member 29 (FIG. 12) is utilized which is provided with recesses 30 which are in accordance with the angles of the frames or beams of the room structure. Screwbolts 31 (FIG. 13) utilized for this design are provided with a flat head 32 so that they engage the recesses 30 of the ball-shaped member 29, and, after rotating on their longitudinal axis (FIG. 12, shown by broken line) can be fixedly attached to the inside wall of the hollow ball-shaped member 29.

Figure 14:
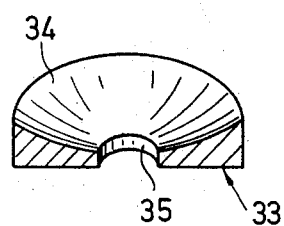
FIG. 14 is a cross-sectional view of an interim ball-shaped disk.
Figure 15:
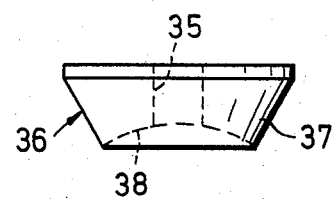
FIG. 15 is a view of a different embodiment of the interim ball-shaped disk.

Additionally, in this case the guide plate 8 with its square opening 9 is replaced by a ball-shaped interim disk 33 (FIG. 14). This disk 33 is provided with a recess 34, commensurate in shape with the hollow ball-shaped member 29, its radius corresponding to the radius of the ball-shaped member 29. It may have a round opening 35 which is larger than the square in cross-section interim means 6 of the screw bolt 4 since the purpose of the disk is to provide a snug fit and the screw head 32 stops the rotation of the screw bolt 4 when it impinges on the ball-shaped member 29. The disk 33 may be provided with a square opening, and may serve the same purpose of setting the screw bolt 4. If a special frame or beam room structure is errected in which the individual beams are arranged only at smaller angles towards one another, then a disk 36 (FIG. 15) is used as the ball-shaped interim disk. This disk 36 has a cone-shaped portion 37 which has a spherical concave recess 38 in the smaller base area with a radius which is in accordance with the radius of ball-shaped member 29. Also, in this case, the opening 35 may be of a form as that of the ball-shaped interim disk 33.

In place of the hollow ball-shaped member 29 there may also be utilized two connected semi-ball-shaped members. Alternatively only one semi-ball-shaped member may be arranged by itself flatly against a wall.

What is claimed is:

1. A plug connection for frame sections comprising a bar having a recess at one end thereof; a cross wall member inside the recess and spaced from the end of the bar, an auxiliary pusher member located at the end of the bar, said cross wall member being provided with a threaded hole; a screw bolt having an enlarged head, a threaded end portion being threaded into said cross wall member, and a portion intermediate said head and threaded portion being square in cross section and the width thereof being at least equal to the diameter of the threaded portion; a biasing means about the screw bolt and positioned between the cross wall and the auxiliary pusher means; and a guide plate being non-rotatably mounted on the intermediate portion of the screw bolt, with the pusher means biasing the guide plate towards the head; the head of the screw bolt being beyond the end of the bar and adapted to fit into a hole and slot means in a member being connected.

2. The plug connection as claimed in claim 1 wherein said pusher means is provided with a center opening having a diameter greater than the diagonals of the intermediate portion of the screw bolt with the pusher means surrounding the screw bolt and being moveable along its axis, the thickness of the pusher means being approximately the length of the intermediate portion of the screw bolt.

3. The plug connection as claimed in claim 2 further comprising a washer mounted on the screw bolt and positioned between the biasing means and the pusher means.

4. The plug connection as claimed in claim 1 wherein said guide plate has an angled extension being a size and shape adapted to cover the open end of the member to which the bar is connected.

5. A plug connection for frame sections comprising a bar having a recess at one end thereof; a cross wall member inside the recess and spaced from the end of the bar, an auxiliary pusher member located at the end of the bar, said cross wall member being provided with a threaded hole; a screw bolt having an enlarged head, a threaded end portion being threaded into said cross wall member, and a portion intermediate said head and threaded portion being square in cross section and the width thereof being at least equal to the diameter of the threaded portion; and a biasing means about the screw bolt and positioned between the cross wall and the auxiliary pusher means; the head of the screw bolt being beyond the end of the bar and adapted to fit into a hole and slot means in a member being connected; wherein the auxiliary pusher means is in the shape of a pipe disk and has a center square opening formed therein of a size non-rotatably fitting on the intermediate portion of the screw bolt, the profile of the pipe disk face of the auxiliary pusher means opposite the biasing means having at least one concave recess of a radius adapted to be commensurate with that of a pipe to which the bar is to be connected.

6. A plug connection for frame sections comprising a bar having a recess at one end thereof; a cross wall member inside the recess and spaced from the end of the bar, an auxiliary pusher member located at the end of the bar, said cross wall member being provided with a threaded hole; a screw bolt having an enlarged head, a threaded end portion being threaded into said cross wall member, and a portion intermediate said head and threaded portion being square in cross section and the width thereof being at least equal to the diameter of the threaded portion; and a biasing means about the screw bolt and positioned between the cross wall and the auxiliary pusher means; the head of the screw bolt being beyond the end of the bar and adapted to fit into a hole and slot means in a member being connected; wherein the auxiliary pusher means is in the shape of a disk having an opening formed therein, accommodating the intermediate portion of the screw bolt, the face of the disk towards the head of the screw bolt having a hemispherical concave contour which is adapted to be commensurate with a ball-shaped member to which the bar is to be connected.

7. The plug connection as claimed in claim 6 wherein the opening in the disk is square and of a size non-rotatably fitting onto the intermediate portion of the screw bolt; the enlarged head of the screw bolt being flattened and having a major and minor dimension.

8. The plug connection as claimed in claim 6 wherein the opening in the disk is large enough to permit the intermediate portion of the screw bolt to rotate therein; the enlarged head of the screw bolt being flattened and having a major and minor dimension.

9. The plug connection as claimed in claim 1 wherein the bar is provided with one of said connectors at opposite ends, the screw bolt of each of said connectors having a different direction thread from each other so that when the bar is rotated one way the screw bolts are simultaneously moved in.

* * * * *